(12) United States Patent
Buell et al.

(10) Patent No.: US 12,285,141 B2
(45) Date of Patent: Apr. 29, 2025

(54) DISPENSERS, DISPENSER SYSTEMS AND REFILL UNITS CONFIGURED FOR AUTONOMOUS FIRMWARE/SOFTWARE UPDATES

(71) Applicant: GOJO Industries, Inc., Akron, OH (US)

(72) Inventors: Shelby Jay Buell, Medina, OH (US); Mark A. Bullock, Wooster, OH (US)

(73) Assignee: GOJO Industries, Inc., Akron, OH (US)

( * ) Notice: Subject to any disclaimer, the term of this patent is extended or adjusted under 35 U.S.C. 154(b) by 111 days.

(21) Appl. No.: 18/352,312

(22) Filed: Jul. 14, 2023

(65) Prior Publication Data
US 2023/0355043 A1 Nov. 9, 2023

Related U.S. Application Data

(63) Continuation of application No. 17/348,836, filed on Jun. 16, 2021, now Pat. No. 11,737,610.
(Continued)

(51) Int. Cl.
*A47K 5/12* (2006.01)
*G06F 8/65* (2018.01)
(Continued)

(52) U.S. Cl.
CPC .............. *A47K 5/1217* (2013.01); *G06F 8/65* (2013.01); *G06K 7/10237* (2013.01); *G06K 19/07705* (2013.01)

(58) Field of Classification Search
CPC .... A47K 5/1217; G06F 8/65; G06K 7/10237; G06K 19/07705
See application file for complete search history.

(56) References Cited

U.S. PATENT DOCUMENTS 9,172,266 B2 * 10/2015 Curtis ..................... H02M 3/02
10,143,339 B2 12/2018 Ciavarella et al.
(Continued)

FOREIGN PATENT DOCUMENTS

WO 2015109262 A2 7/2015
WO 2018224520 A1 12/2018

OTHER PUBLICATIONS

International Search Report and Written Opinion from PCT/US2021/037539 dated Sep. 7, 2021.

*Primary Examiner* — Donnell A Long
(74) *Attorney, Agent, or Firm* — Calfee, Halter & Griswold LLP

(57) ABSTRACT

Exemplary embodiments of dispensing systems, dispensers, refill units, methods for autonomously updating firmware and/or software in dispensers are disclosed herein. An exemplary dispenser includes a dispenser housing, an object sensor, a near field communications reader, a power source, a processor and a memory. First logic is stored in the memory for controlling the dispenser. The first logic does not enable the object sensor. The system includes a refill unit having a container, a near field communications tag and a software or firmware update stored on the near field communications tag. The software or firmware update comprises second logic for updating the first logic stored in the memory for controlling the dispenser and wherein the second logic enables the object sensor.

20 Claims, 4 Drawing Sheets

Related U.S. Application Data

(60) Provisional application No. 63/043,180, filed on Jun. 24, 2020.

(51) Int. Cl.
*G06K 7/10* (2006.01)
*G06K 19/077* (2006.01)

(56) References Cited

U.S. PATENT DOCUMENTS

| | | |
|---|---|---|
| 2002/0140966 A1 | 10/2002 | Meade, II et al. |
| 2005/0097542 A1 | 5/2005 | Lee |
| 2005/0127090 A1 | 6/2005 | Sayers et al. |
| 2010/0163573 A1 | 7/2010 | Wegelin et al. |
| 2011/0143661 A1 | 6/2011 | Hartwig et al. |
| 2012/0241470 A1* | 9/2012 | Snodgrass ............. A61L 2/0088 222/639 |
| 2013/0326495 A1 | 12/2013 | Reunamaki et al. |
| 2014/0373003 A1 | 12/2014 | Grez et al. |
| 2016/0309967 A1* | 10/2016 | Pelfrey ................ A47K 5/1217 |
| 2017/0049276 A1* | 2/2017 | Lightner ............. B05B 11/0054 |
| 2018/0310780 A1 | 11/2018 | Mahaffey et al. |
| 2018/0354777 A1* | 12/2018 | Slater ................... G06Q 10/087 |
| 2019/0133384 A1 | 5/2019 | McNulty et al. |

\* cited by examiner

DISPENSERS, DISPENSER SYSTEMS AND REFILL UNITS CONFIGURED FOR AUTONOMOUS FIRMWARE/SOFTWARE UPDATES

RELATED APPLICATIONS

This application is a continuation of U.S. patent application Ser. No. 17/348,836, filed on Jun. 16, 2021, which claims priority to, and the benefits of, U.S. Provisional Patent Application No. 63/043,180, filed on Jun. 24, 2020 and which is incorporated in its entirety herein by reference.

TECHNICAL FIELD

The present invention relates generally to touch free dispensers and dispenser systems and more particularly to touch free dispensers and dispenser systems configured to receive autonomous firmware/software updates and refill units having autonomous firmware/software update instructions.

BACKGROUND OF THE INVENTION

Some touch-free dispensers for soap, sanitizer and lotion utilize firmware and/or software to control various functions relating to operating the dispensers, collecting data, and sharing data. Over time thousands if not millions of touch-free dispensers may be distributed and mounted in offices, hospitals, restaurants, retail establishments, bathrooms etc. throughout the world. Occasionally, the dispensers have firmware/software bugs or other issues that are discovered and that ideally would be fixed or updated. Generally the dispensers cannot be, or are not ever, updated because it is extremely difficult and/or cost prohibitive to correct such issues due to the large volume of touch-free dispensers installed throughout the world and the thousands and thousands of different locations in which they are installed.

SUMMARY

Exemplary embodiments of dispensing systems, dispensers, refill units, methods for autonomously updating firmware and/or software in dispensers are disclosed herein. An exemplary dispenser includes a processor, dispenser memory, firmware for controlling one or more operations of the dispenser and a receptacle for receiving a refill unit. A reader for reading information from a near field communication tag is also included. The refill unit includes a near field communication tag secured thereto. Memory is located on the near field communications tag. Data stored on the memory. The data contains firmware update instructions. When the refill unit is installed in the receptacle, the reader reads the data. The processor causes the dispenser firmware to be updated by the firmware update instructions read from the near field communications tag on the refill unit.

Another exemplary dispenser includes a processor, dispenser memory, software for controlling one or more operations of the dispenser and a receptacle for receiving a refill unit. A reader for reading information from a near field communication tag is also included. The refill unit includes a near field communication tag secured thereto. Memory is located on the near field communications tag. Data stored on the memory. The data contains software update instructions. When the refill unit is installed in the receptacle, the reader reads the data. The processor causes the dispenser software to be updated by the firmware update instructions read from the near field communications tag on the refill unit.

Another exemplary dispenser includes a processor, dispenser memory, logic on the dispenser memory for controlling one or more operations of the dispenser and a receptacle for receiving a refill unit, and wireless communication circuitry for reading information from a refill memory. A refill unit having near field communications circuitry is also provided. The refill unit includes memory on the near field communications circuitry and data stored on the memory. The data contains logic update instructions. When the refill unit is installed in the receptacle, the wireless communication circuitry reads the data and the processor causes the dispenser logic to be updated by the logic update instructions.

An exemplary soap, sanitizer or lotion refill unit includes a container for holding one of a soap, a sanitizer and a lotion. A near field communication tag associated with the container. Refill unit memory on is located the near field communication tag. Data stored on the refill unit memory. The refill unit further comprises logic update instructions stored on the refill unit memory. The logic update instructions are configured to cause a logic update on one or more dispensers when the one or more dispensers interrogate the refill unit memory.

An exemplary methodology for updating a dispenser includes providing a refill unit. The refill unit includes a near field communication tag. Data is stored on the near field communication tag. logic update instructions are stored on the near field communication tag. The methodology further includes providing a dispenser. The dispenser has a processor, memory, logic stored in the memory for controlling one or more dispenser functions and a receptacle for receiving a refill unit. The dispenser further includes wireless communication circuitry for reading data from the near field communication tag. The data read from the near field communication tag contains a logic update, the processor causes the logic stored in the memory of the dispenser to be updated.

An exemplary method of updating a soap or sanitizer dispenser includes providing a refill unit, securing a near field communication tag and storing update logic on the near field communication tag. Wherein when the refill unit is placed in a dispenser that has a processor, memory, dispenser logic stored in the memory for controlling one or more dispenser functions, the update logic stored on the near field communication tag causes the update logic to update the dispenser logic.

An exemplary method of manufacture of a soap or sanitizer dispenser includes providing a dispenser housing, an object sensor, a near field communications reader, a power source, a processor, and a memory. The method further comprises storing first logic in the memory for controlling the dispenser wherein the first logic does not enable the object sensor. The method further includes providing a refill unit that has a container, a near field communications tag and a software or firmware update stored on the near field communications tag. Wherein the software or firmware update comprises second logic for updating the first logic stored in the memory for controlling the dispenser and the second logic enables the object sensor.

BRIEF DESCRIPTION OF THE DRAWINGS

These and other features and advantages of the present invention will become better understood with regard to the following description and accompanying drawings in which.

DETAILED DESCRIPTION

The following includes definitions of exemplary terms used throughout the disclosure. Both singular and plural forms of all terms fall within each meaning. Except where noted otherwise, capitalized and non-capitalized forms of all terms fall within each meaning:

"Circuit communication" as used herein indicates a communicative relationship between devices. Direct electrical, electromagnetic, and optical connections and indirect electrical, electromagnetic, and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers, or even satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a CPU, are in circuit communication.

Also, as used herein, voltages and values representing digitized voltages are considered to be equivalent for the purposes of this application and thus the term "voltage" as used herein refers to either a signal, or a value in a processor representing a signal, or a value in a processor determined from a value representing a signal.

"Signal", as used herein includes, but is not limited to one or more electrical signals, analog or digital signals, one or more computer instructions, a bit or bit stream, or the like.

"Logic", synonymous with "circuit" as used herein includes, but is not limited to hardware, firmware, software and/or combinations of each to perform a function(s) or an action(s). For example, based on a desired application or needs, logic may include a software controlled microprocessor or microcontroller, or other programmed logic device. Logic may also be fully embodied as software. The circuits identified and described herein may have many different configurations to perform the desired functions.

The values identified in the detailed description are exemplary and they are determined as needed for a particular dispenser and/or refill design. Accordingly, the inventive concepts disclosed and claimed herein are not limited to the particular values or ranges of values used to describe the embodiments disclosed herein.

Figures 1, 2:
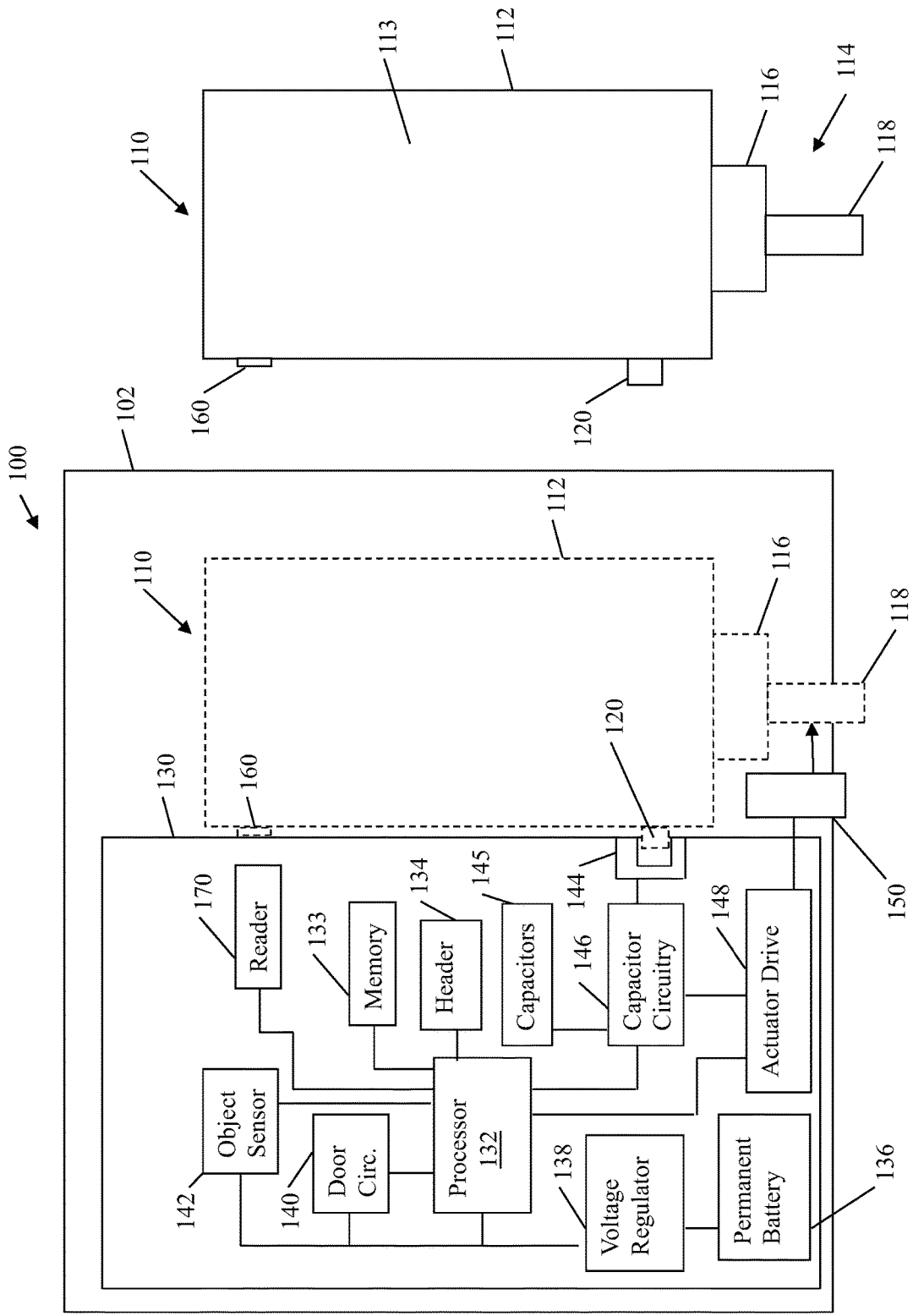
FIG. 1 is a schematic view of an exemplary embodiment of a dispenser configured for receiving autonomous firmware and/or software updates.
FIG. 2 is a schematic view of an exemplary embodiment of a refill unit having a near field communications tag with firmware and/or software updates.

FIG. 1 illustrates an exemplary embodiment of touch-free dispenser 100 that is configured for autonomous firmware and/or software updates. In this exemplary embodiment, dispenser 100 includes a housing 102. Located within housing 102 is a system circuitry 130. System circuitry 130 may be on a single circuit board or may be on multiple circuit boards. In addition, some of the circuitry may not be on a circuit board, but rather individually mounted and electrically connected to the other components as required. In this embodiment, system circuitry 130 includes a processor 132, memory 133, an optional header 134, a permanent power source 136, an optional voltage regulator 138, optional door switch circuitry 140, an object sensor 142, actuator drive circuitry 148, an optional bank of capacitors 145, optional capacitor control circuitry 146, optional replaceable power source interface receptacle 144; and a reader 170.

Processor 132 may be any type of processor, such as, for example a microprocessor, or the like. Processor 132 is in circuit communication with header 134. Header 134 is a connection port so that a user can connect to system circuitry 130 to manually program the circuitry, run diagnostics on the circuitry, and/or retrieve information from the circuitry. The header 134 is a physical connection that requires a user to physical connect a device to the system circuitry 130.

Processor 132 is in circuit communication with memory 133. Memory 133 may be include any type of memory, such as, for example, Random Access Memory (RAM); Read Only Memory (ROM); programmable read-only memory (PROM), electrically programmable read-only memory (EPROM), electrically erasable programmable read-only memory (EEPROM), or the like, or combinations thereof. In some embodiments, the memory 133 is separate from the processor 132 and in some embodiments, the memory 133 resides on, or within, processor 132.

In this exemplary embodiment, a permanent power source 136, such as for example, one or more batteries are also provided. The permanent power source 136 is preferably designed so that the permanent power source 136 does not need replaced for the life of the dispenser 100. The permanent power source 136 is in circuit communication with voltage regulator circuitry 138. In some exemplary embodiments, voltage regulator circuitry 138 provides regulated power to processor 132, object sensor 142, reader 170, and door circuitry 140. Permanent power source 136 may be used to provide power to other circuitry that requires a small amount of power and will not drain the permanent power source 136 prematurely.

In some embodiments, processor 132 is in circuit communication with optional door circuitry 140 so that processor 132 knows when the dispenser 100 door (not shown) is closed. In some embodiments, processor 132 will not allow the dispenser 100 to dispense a dose of fluid if the door is open. Door circuitry 140 may be any type of circuitry, such as, for example, a mechanical switch, a magnetic switch, a proximity switch or the like.

Processor 132 is also in circuit communication with an object sensor 142 for detecting whether an object is present in the dispense area. Object sensor 142 may be any type of passive or active object sensor, such as, for example, an infrared sensor and detector, a proximity sensor, an imaging sensor, a thermal sensor, or the like.

In addition, processor 132 is in circuit communication with actuator drive circuitry 148. In this exemplary embodiment, actuator drive circuitry 148 causes a motor and associated gearing 150 to operate a foam pump 114 located on a refill unit 110. In some embodiments, actuator drive circuitry 148 causes a permanent pump (not shown) located within the dispenser 100 to pump fluid out of the refill unit. In some embodiments, the permanent pump is a sequentially activated multi-diaphragm foam pump, such as, for example, those shown and described in U.S. Pat. No. 10,143,339, which is incorporated herein by reference in its entirety. An exemplary embodiment of a touch-free dispenser may be found in U.S. Pat. No. 9,172,266, which is incorporated herein by reference in its entirety.

In this exemplary embodiment, refill unit 110 is shown in phantom lines inserted in the dispenser 100 in FIG. 1 and refill unit 110 is also illustrated in solid lines in FIG. 2. Refill unit 110 is readily inserted into dispenser 100 and removed from dispenser 100 as a unit. In this exemplary embodiment, refill unit 110 includes a container 112, and an optional foam pump 114 that includes an air compressor 116 and an outlet nozzle 118. Refill unit 110 also includes a foamable liquid 113, such as, for example, a foamable soap, sanitizer, lotion, moisturizer, or other liquid used for personal hygiene.

In some embodiments, refill unit 110 is for use in a liquid dispenser, rather than a foam dispenser, and filled with liquid that is not foamed. Accordingly, air compressor 116 is not required.

In some embodiments, pump 114 and outlet nozzle 118 are part of the dispenser 100 and the refill unit 110 includes a sealing member (not shown) for sealing an opening (not shown) in the bottom of the container 112 that us used for placing the interior of container 112 in fluid communication with the dispenser pump and outlet nozzle. In such embodiments, pump 114 may be a foam pump or a liquid pump.

In this exemplary embodiment, refill unit 110 includes a replaceable power source 120. Replaceable power source 120, may be any power source, such as for example, a single "AA" battery. In some embodiments, the replaceable power source 120 does not contain enough power and/or a high enough voltage to directly power a motor and associated gearing 150 to dispense the contents of the refill unit 110, or to power a pump (not shown) that does not require the associated gearing 150. In this exemplary embodiment, replaceable power source 120 is inserted into dispenser 100 with refill unit 110 and is removed from dispenser 100 with refill unit 110. Preferably refill unit 110 has replaceable power source 120 affixed thereto, however, in some embodiments, the replaceable power source 120 is provided separately with the refill unit 110. In either case, however, the replaceable power source 120 is installed with and removed with the refill unit 110.

Refill unit 110 includes a near field communication tag 160. Near field communication tag 160 ("NFC" tag 160" is an electronically readable device). In some exemplary embodiments, the term NFC may include, for example, radio frequency identification devices ("RFIDs"). NFC tag 160 is a passive device that contains information. In some embodiments, NFC tag 160 is an active device. Dispenser 100 includes a reader 170 that may be used to read the NFC tag 160 when the NFC tag 160 is installed in the dispenser.

In some embodiments, the NFC tag 160 utilizes ISO/IEC 18000-3, which is an international standard for devices communicating wirelessly at the 13.56 MHz frequency using Type A or Type B cards. In some embodiments, the NFC tag 160 and reader 170 must be proximate one another, such as, for example, within 4 centimeters of each other before they can transmit information.

During normal operation, when the refill unit 110 is placed in dispenser 100, NFC tag 160 is placed proximate reader 170. Reader 170 broadcasts a signal to the NFC tag 160. NFC tag 160 becomes powered by the signal transmitted from reader 170. The signal powers the NFC tag 160 and the resulting high frequency magnetic field loosely couples one or more coils on the NFC tag 160 with one or more coils on reader 170. Once this field is established and the connection is formed, information can be passed between the reader 170 and the NFC tag 160. In some embodiments, the reader 170 sends a first message to the NFC tag 160 to find out what type of communication the NFC tag 160 uses, such as Type A or Type B. When the NFC tag 160 responds, the reader 170 sends its first commands in the appropriate specification. In some embodiments, the NFC tag 160 receives the instruction and checks if the instruction is valid. If the signal is not valid, nothing occurs. If the signal is a valid request, the NFC tag 160 then responds with the requested information.

In some embodiments, NFC tag 160 functions at half duplex while the reader functions at full duplex. Half duplex refers to a device that can only send or receive, but not both at once. Full duplex can send and receive signals simultaneously. Thus, in this exemplary embodiment, NFC tag 160 can only receive or send a signal, while the reader 170 can receive a signal at the same time it sends a command or signal. In some embodiments, commands are transmitted from the reader using PJM (phase jitter modulation) to modify the surrounding field and send out a signal. The NFC tag 160 answers using inductive coupling by sending a charge through its coils.

In this exemplary embodiment, system circuitry 130 also includes a bank of capacitors 145 and capacitor control circuitry 146 in circuit communication with processor 132. The bank of capacitors 145 and capacitor control circuitry 146 is in circuit communication with replaceable power source interface receptacle 144 and actuator drive 148. Replaceable power source interface receptacle 144 is configured to receive and/or otherwise electrically couple with replaceable power source 120 when a refill unit 110 is inserted in the dispenser 100.

During operation, when a refill unit 110 is inserted into dispenser 100, processor 132 and capacitor control circuitry 146 cause the bank of capacitors to charge in parallel. In one exemplary embodiment there are three capacitors. Preferably, the capacitors are oversized for the required power to power the motor and associated gearing 150 to dispense a dose of foam. The oversized capacitors are preferably charged to a point that is less than the fully charged values of the capacitors. Because the bank of capacitors 145 is charged to less than full capacity, there is less discharge in the capacitors when they are idle for a period of time. In some embodiments, the capacitors are charge to less than about 50% of their full capacity. In some embodiments, the capacitors are charged to less than about 75% of their full capacity. In some embodiments, the capacitors are charged to less than about 90% of their full capacity.

When the processor 132, through object sensor 142, determines that an object is within the dispense zone, the processor 132 causes the capacitor control circuitry 146 to place the capacitors in series to provide power to the actuator drive circuitry to power the motor and associated gearing 150 to operate foam pump 118. Once a dose has been dispensed, processor 132 checks the charge on the capacitors 145. If the charge is below a threshold, the processor 132 causes the capacitor control circuitry 146 to charge the capacitors 145. The capacitors 145 are charged in parallel.

Figure 3:
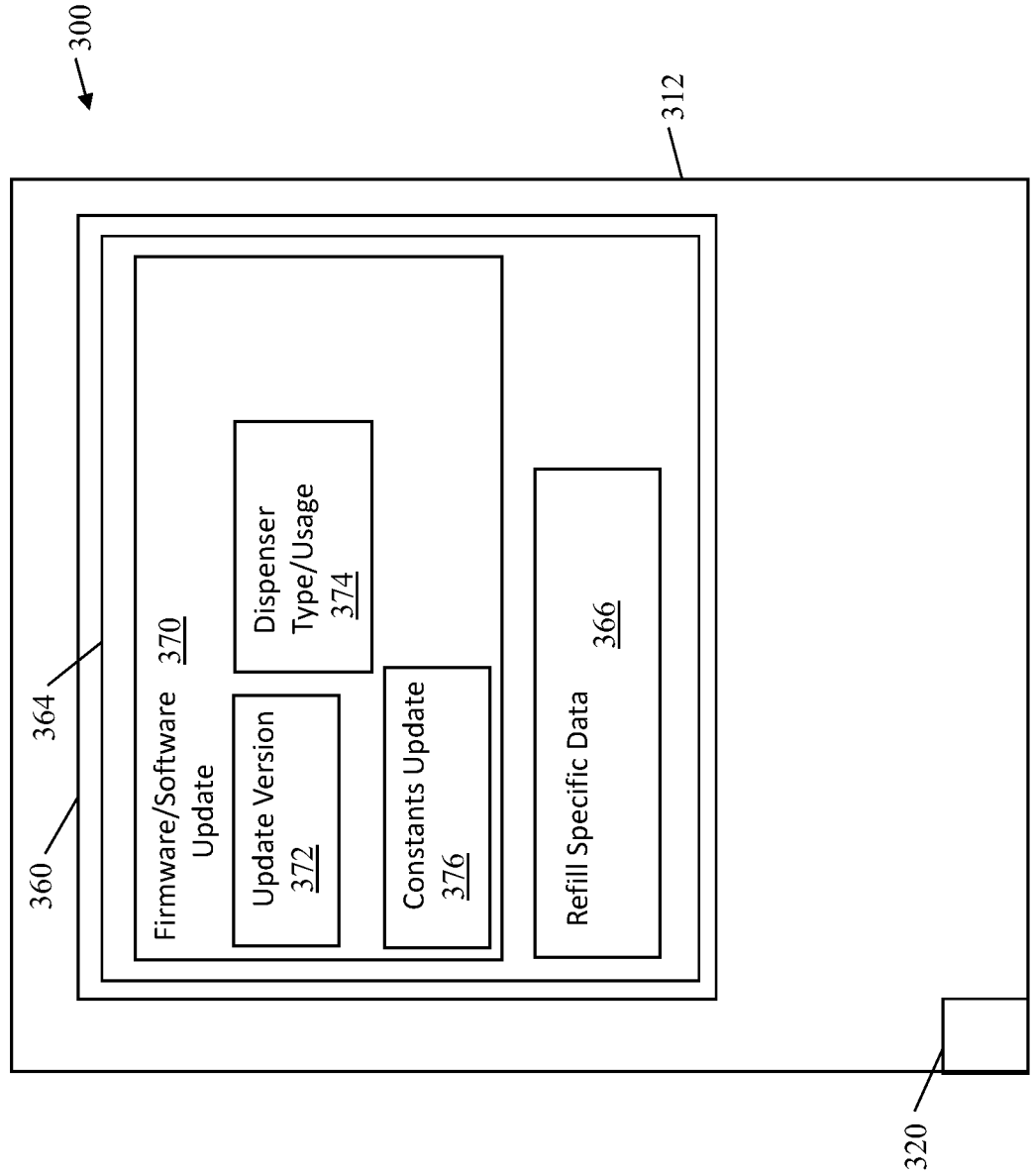
FIG. 3 is a schematic view of an exemplary embodiment of a refill unit having a near field communications tag with firmware and/or software updates.

FIG. 3 is a schematic diagram of an exemplary refill unit 300. Exemplary refill unit 300 may be the same as, or similar to, refill unit 110 and may include an optional pump. In this exemplary embodiment, however, refill unit 300 does not include an optional pump. In this exemplary embodiment, refill unit 300 includes a container 312 for holding a fluid (not shown), such as, for example, sanitizer, soap or lotion. Refill unit 300 also includes an optional power supply 300. Power supply 300 may be used to transfer power to a dispenser (not shown), such as shown and described above and incorporated herein. Refill unit 300 includes NFC tag 360, which may be secured to container 312 or any other part of the refill unit 300. In this exemplary embodiment, NFC tag 360 is a passive near field communication tag, however, in some embodiments, NFC tag 360 may be an active tag, and in some embodiments, may be powered by power source 320.

NFC tag 360 contains memory 364. In some embodiments, located in memory 364 is refill specific data or information 366. Refill specific data 366 includes information that is specific to the refill unit 300 or descriptive of the refill unit 300. Refill specific data 366 may be, for example, a serial number, a manufacture date, a manufacture location, one or more distributor authorization codes, an expiration date, a volume, type of fluid, fluid dose sizes, or the like.

In addition, in this exemplary embodiment, memory 364 incudes firmware and/or software update 370. The firmware/ and or software update 370 may include an optional update version 372, an optional dispenser type/usage 374, one or more update constants 376, and the like. The update version 372 is be read by the dispenser (e.g. dispenser 100) and compared to the firmware/software version currently running on the dispenser. If the firmware/software version running on the dispenser is the same or newer, the update 370 may be ignored. If the firmware/software version running on the dispenser is the older, the update 370 may be installed. In some embodiments, no version is included in the memory 364. Thus, any compatible dispenser that receives the update 370 will run the firmware/software update.

In some embodiments, the firmware/software update includes a dispenser type/usage 372. In such cases, the firmware/software update 370 may run on selected dispensers that match the dispenser type/usage 372, but not on others. Thus, a "universal" refill unit, i.e. a refill unit that will work in multiple types of dispensers, may include the firmware/software update, but the updates will only run on a selected subset of the dispensers.

In addition, in some embodiments, the firmware/software update 370 is designed to only run on dispensers that have a selected demographic, such as, for example, those that are of a selected age, or have had a selected volume of throughput run through them over a selected period of time. For example, it may be determined that dispensers that are three years old and/or dispensers that have dispensed more than four refill units should be reconfigured to dispense at a different volume than currently configured, and the firmware/software update may be used to change the volume of output on only those dispensers over the selected age or volume throughput.

In some embodiments, the firmware/software update 370 includes a constants update 374. Constants updates 374 may be particularly useful for firmware updates, or updates worth NFC tags having smaller amounts of memory. Exemplary constants that may be autonomously updated include, for example, the liquid to air ratio for foam outputs; a cut-off voltage, i.e. a voltage level of the power source at which point the dispenser will not function; a speed profile configured to limit dripping or tailing of the dispensed output; altering the hand-sensing parameters, e.g. how often the sensor looks for a hand; on/off rate of one or more status indicators or light; speed of the system clock, e.g. 20 MHz or 5 MHz; low power mode settings; whether to check for an authentication tag; NFC tag excitation time; sensor settings, e.g. difference in light between a target and no target; start speed; length of time to wait for target to leave sensing area; number of to targets; and the like.

Figure 4:
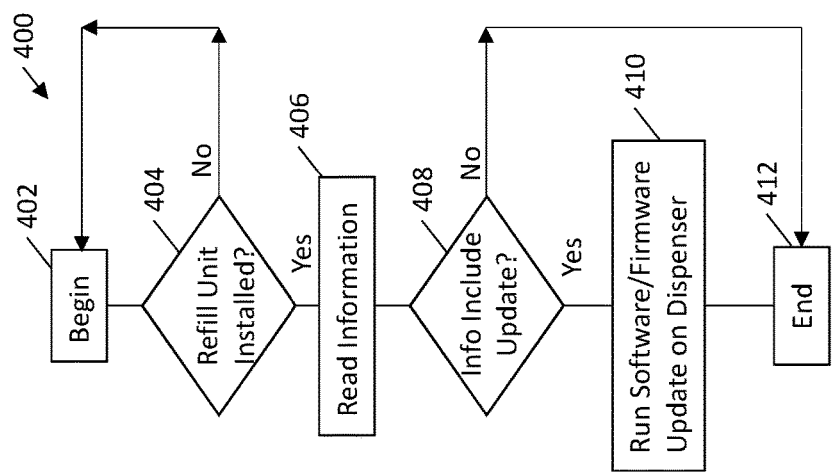
FIG. 4 is an exemplary embodiment of a methodology or logic diagram for autonomously updating a dispenser firmware and/or software using a refill unit.

FIG. 4 is an exemplary methodology 400 or logic diagram for autonomously updating software and/or firmware in a dispenser. The exemplary methodologies shown and disclosed herein are exemplary embodiments. In some embodiments, more or fewer steps or blocks may be used. In addition, unless noted to the contrary, blocks or steps may be performed in different orders. Further, steps or blocks in one exemplary embodiment may be added to or removed from other exemplary embodiments.

The exemplary methodology begins at block 402. At block 404 a determination is made as to whether a refill unit having a NFC tag is installed in the dispenser. If no refill unit is installed in the dispenser, or the refill unit does not have an NFC tag, the methodology loops back to the beginning. If a refill unit with a NFC tag is installed, the dispenser reads the information from the NFC tag at block 406. The information from the NFC tag may include information such as, for example, refill unit serial number, refill unit expiration date, refill unit fluid volume, refill unit distributor identification information, software updates, firmware updates, and the like. If at block 408 a determination is made that no firmware or software updates have been identified, the methodology loops to block 412 and ends. If at block 408 a determination is made that firmware or software updates have been identified, the methodology flows to block 410.

In some embodiments, at block 408, the dispenser compares the firmware/software updates with the version of firmware/software that is currently running on the dispenser. If the version of the firmware/software that is currently running on the dispenser is the same as the update, the methodology flows t block 412 and ends. If the version is different, the methodology flows to block 410. At block 410, the dispenser runs the software and/or firmware updates on the dispenser. The dispenser stores the updated software and/or firmware in the dispensers memory. If needed, the dispenser reboots and starts up. Once the dispenser has rebooted or restarted, the dispenser operates using the updated software and/or updated firmware. The firmware/software may be a complete update of the firmware/software or may be a partial update. In some embodiments, the update is updating of one or more constants. In some embodiments, the dispenser runs the updates at a set time, such as, for example, 2 a.m. in order to prevent downtime on the dispenser. In some embodiments, the dispenser request user input on whether to run the update immediately or whether to run at a later time.

Figure 5:
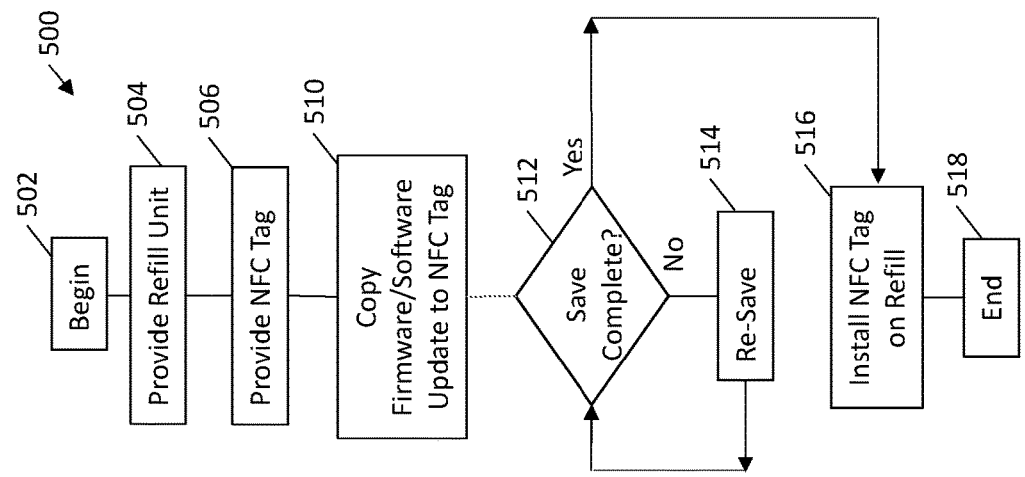
FIG. 5 is an exemplary embodiment of a methodology or logic diagram for providing a refill unit having a near field communications tag with firmware and/or software updates for autonomously updating a dispenser firmware and/or software.

FIG. 5 is an exemplary methodology of programming a near field communication tag on a refill unit. The exemplary methodology begins at block 502. At block 504 a refill unit is provided. In some embodiments, the refill unit is a container having a pump attached thereto. In some embodiments, the refill unit has been filled prior to applying the NFC Tag. In some embodiments, the refill unit is filled after applying the NFC tag to the refill unit. At block 506 a NFC tag is provided. At block 510 the firmware or software update is copied to the NFC tag. Preferably, refill specific data is stored on the NFC tag at the same time. At block 512 a determination is made as to whether the firmware and/or software has been correctly saved on the NFC tag. If it has, the methodology loops to block 516. If not the firmware and/or software update is resaved at block 514. At block 516, the NFC tag is secured to the refill unit and the methodology ends at block 518.

Preferably, the refill unit is a standard refill unit that includes a container having a fluid desired to be dispensed, such as, for example, sanitizer, soap or lotion. In some embodiments, the refill unit is a dummy refill unit and does not contain a fluid. In some embodiments, depending on the location of the NFC tag, the dummy refill unit may not include one or more components of a standard refill and indeed may not even physically resemble a refill unit.

Touch-free dispensers have one or more sensors for sensing when an object is present in a sensing area. If the batteries are placed in the dispenser at the time of manufacture and then placed in a box, the sensor checks to see if an object is present as it normally would do which causes the batteries to begin draining power. Some touch-free dispensers have a switch to turn off the power, or a plastic tab between a battery contact and the dispenser contact that needs to be removed from the dispenser when the dispenser is placed in operation. Problems occur when an installer forgets to flip the switch or remove the plastic during installation. In this exemplary methodology, the dispenser may be manufactured, batteries placed in the dispenser and dispenser boxed up without the need for a switch or plastic tab.

Figure 6:
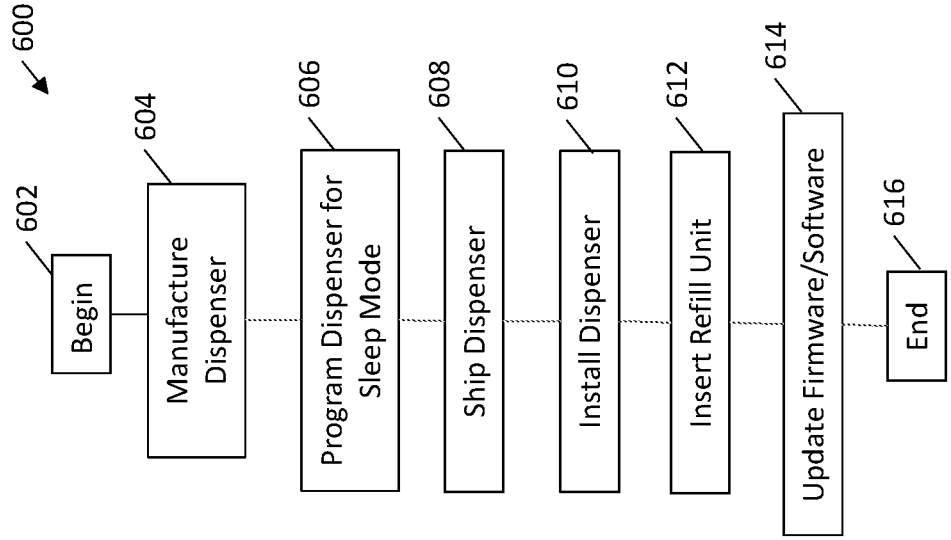
FIG. 6 is and exemplary embodiment of a methodology or logic diagram for manufacturing a dispenser having a sleep mode or disabled mode and that receives a firmware and/or software update via a refill unit having a near field communications tag with firmware and/or software updates.

FIG. 6 is an exemplary methodology for dispenser that "sleeps" until a refill unit with an firmware and/or software update is installed in the dispenser. The exemplary methodology begins at block 602. At block 604 the dispenser is manufactured. During manufacture, the dispenser is completed and the batteries are installed. At block 606, the dispenser is programmed. The dispenser is programed to be in a sleep mode, or to be in a mode that disables the sensor for sensing an object in the sensing area. In a sleep mode, the sensor enters a power savings mode and only wakes up and searches for an object periodically. In a dispenser disabled mode, the sensor does not wake up and search for an object.

The dispenser is shipped at block 608 and is installed at block 610. Once the dispenser is installed, a refill unit is installed at block 612. The refill includes a NFC tag. In some embodiments, when the NFC tag is placed proximate a reader in the dispenser circuitry reads the update information on the NFC tag and updates the firmware and/or software. The firmware/software updates at block 614 and the sensor is set to actively search for an object in the sensing zone in a normal operation. The exemplary methodology ends at block 616.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. It is not the intention of the applicant to restrict or in any way limit the scope of the appended claims to such detail. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

We claim:

1. A soap or sanitizer dispenser system comprising:
a dispenser housing;
an object sensor;
a near field communications reader;
a power source;
a processor; and
a memory;
first logic stored in the memory for controlling the dispenser;
wherein the first logic does not enable the object sensor;
a refill unit configured to be installed in the dispenser; the refill unit comprising:
the refill unit including
a container;
a near field communications tag;
a software or firmware update stored on the near field communications tag;
wherein the software or firmware update comprises second logic for updating the first logic stored in the memory for controlling the dispenser and wherein the second logic enables the object sensor.

2. The soap or sanitizer dispenser of claim 1 wherein the software or firmware update comprises code for updating one or more constants.

3. The soap or sanitizer dispenser of claim 2 wherein the one or more constants is the liquid to air ratio for a foam output.

4. The soap or sanitizer dispenser of claim 2 wherein the one or more constants is a cut-off voltage.

5. The soap or sanitizer dispenser of claim 2 wherein the one or more constants is a speed profile configured to limit dripping or tailing of the dispensed output.

6. The soap or sanitizer dispenser of claim 2 wherein the one or more constants alters a sensing parameter of the object sensor.

7. The soap or sanitizer dispenser of claim 2 wherein the one or more constants is on/off rate of one or more status indicators or light.

8. The soap or sanitizer dispenser of claim 2 wherein the one or more constants is a speed of a system clock.

9. The soap or sanitizer dispenser of claim 2 wherein the one or more constants is one or more low power mode settings.

10. The soap or sanitizer dispenser of claim 2 wherein the one or more constants is whether to check for an authentication tag.

11. The soap or sanitizer dispenser of claim 2 wherein the one or more constants is an NFC tag excitation time.

12. The soap or sanitizer dispenser of claim 2 wherein the one or more constants is a sensor setting.

13. The soap or sanitizer dispenser of claim 2 wherein the one or more constants is a start speed.

14. The soap or sanitizer dispenser of claim 2 wherein the one or more constants is a length of time to wait for a target to leave a sensing area of the object sensor or number of targets.

15. A soap or sanitizer dispenser comprising:
a processor;
dispenser memory;
firmware for controlling one or more operations of the dispenser;
a sensor for sensing an object;
a receptacle for receiving a refill unit;
a reader for reading information from a near field communication tag;
wherein the firmware prevents operation of the sensor for sensing an object; and
a receptacle for receiving a refill unit.

16. The soap or sanitizer dispenser of claim 15 further comprising:
a refill unit;
wherein the refill unit is configured to be received by the receptacle;
the refill unit having the near field communication tag secured thereto;
memory on the near field communications tag;
firmware update code stored on the memory;
wherein when the refill unit is installed in the receptacle, the reader reads the firmware update code; and
wherein the processor causes the dispenser firmware to be updated by the firmware update to enable the sensor for sensing an object.

17. The soap or sanitizer dispenser of claim 16 wherein the firmware update code comprises code for updating one or more constants.

18. The soap or sanitize dispenser of claim 17, wherein the one or more constants are one or more of: a liquid to air ratio for a foam output; a cut-off voltage; a speed profile; a sensing parameter alteration for the object sensor; an on/off rate of one or more status indicators; a speed of a system clock; one or more low power mode settings; and whether to check for an authentication tag.

19. A refill unit for a soap or sanitizer dispenser comprising:
near field communication tag secured thereto;
memory on the near field communications tag;
firmware update code stored on the memory;
wherein the firmware update code contains code to enable an object sensor in a dispenser.

20. The refill unit of claim 19 wherein the firmware update code contains code modify one or more constants and wherein the one or more constants comprise one or more of a liquid to air ratio for a foam output; a cut-off voltage; a speed profile; a sensing parameter alteration for the object sensor; an on/off rate of one or more status indicators; a speed of a system clock; one or more low power mode settings; and whether to check for an authentication tag.

* * * * *